(12) United States Patent
Potter et al.

(10) Patent No.: US 8,476,403 B2
(45) Date of Patent: Jul. 2, 2013

(54) CROSSLINKING OF REACTIVE POLYOLEFIN PREPOLYMERS USING A COREACTANT

(75) Inventors: David K. Potter, Guelph (CA); Tayyab Hameed, Hamilton (CA)

(73) Assignee: McMaster University, Hamilton, Ontario (*) Notice: Subject to any disclaimer, the term of this patent is extended or adjusted under 35 U.S.C. 154(b) by 0 days.

(21) Appl. No.: 12/933,559

(22) PCT Filed: Mar. 18, 2009

(86) PCT No.: PCT/CA2009/000345
§ 371 (c)(1),
(2), (4) Date: Dec. 9, 2010

(87) PCT Pub. No.: WO2009/114944
PCT Pub. Date: Sep. 24, 2009

(65) Prior Publication Data
US 2011/0098415 A1    Apr. 28, 2011

Related U.S. Application Data

(60) Provisional application No. 61/064,647, filed on Mar. 18, 2008.

(51) Int. Cl.
C08G 81/02    (2006.01)
C08F 8/32    (2006.01)
C08L 23/26    (2006.01)
C08L 91/06    (2006.01)

(52) U.S. Cl.
USPC .............................. 528/392; 528/422; 528/425

(58) Field of Classification Search
USPC ............... 525/66, 69; 528/272, 422, 425, 392
See application file for complete search history.

(56) References Cited

U.S. PATENT DOCUMENTS

| 4,877,827 A * | 10/1989 | Van Der Groep ............. 524/477 |
| 5,455,304 A * | 10/1995 | Roberts ......................... 525/175 |
| 6,048,610 A | 4/2000 | St. Coeur et al. |
| 2003/0124358 A1* | 7/2003 | Vollenberg et al. ......... 428/423.5 |
| 2011/0244232 A1* | 10/2011 | Hall et al. ............... 428/355 EN |

FOREIGN PATENT DOCUMENTS

| EP | 0922714 | 6/1999 |
| EP | 1 661 953 | 5/2006 |
| JP | 7-62248 | 3/1995 |
| JP | 2002-53730 | 2/2002 |
| JP | 2002284880 | 10/2002 |

OTHER PUBLICATIONS

International Search Report of PCT/CA2009/000345.
European Search Report issued in corresponding European Patent Application No. EP09722964 on May 20, 2011.

* cited by examiner

*Primary Examiner* — Jeffrey Mullis
(74) *Attorney, Agent, or Firm* — Bacon & Thomas, PLLC

(57) ABSTRACT

The present invention provides a cross linked polyolefin thermoset material, comprising maleic anhydride functionalized reactive polyolefin wax cross linked with a polyamine. The thermoset may be made by a method involving reaction of a maleic anhydride functionalized reactive polyolefin wax with a polyamine. The polyolefin may be polyethylene, polypropylene and their copolymers. The polyamine is a primary or secondary alkyl polyamines, alkyl ether polyamines, aryl polyamines. Polyols may be used instead of polyamines, for example alkyl polyols, alkyl ether polyols or aryl polyols.

31 Claims, 9 Drawing Sheets

CROSSLINKING OF REACTIVE POLYOLEFIN PREPOLYMERS USING A COREACTANT

CROSS REFERENCE TO RELATED U.S. APPLICATION

This patent application is a National Phase application claiming the benefit of PCT/CA2009/000345 filed on Mar. 18, 2009, in English, entitled CROSSLINKING OF REACTIVE POLYOLEFIN PREPOLYMERS USING A POLYETHERDIAMINE; which further claims the priority benefit from, U.S. Provisional Patent Application Ser. No. 61/064,647 filed on Mar. 18, 2008, both of which are incorporated herein by reference in their entirety.

FIELD OF THE INVENTION

The present invention relates to synthesis of polyolefin (polyethylene, polypropylene and their copolymers) thermosets using the reaction of maleic anhydride, or other, functionalized polyolefin waxes obtained using metallocene or Ziegler Natta catalysts, or other methods, with a polyamine.

BACKGROUND OF THE INVENTION

Current methods for crosslinked polyolefin synthesis include a first method which involves grafting of silane moieties on the high molecular weight polymer using reactive extrusion and subsequent curing of silane groups by moisture curing in the presence of a suitable catalyst. Synthesis of copolymer of olefin and vinyl silane are also reported. However, in both cases high molecular weight polymer needs to be extruded into the end use article and then moisture cured to generate Si—O—Si linkages. The moisture curing is a very slow process taking several hours to days. The diffusion of moisture limits the thickness and shape of the end use article.

A second method involves the extruding the high molecular weight polyolefin into the end use article which is then irradiated with high energy electron beam. The electron beam creating reactive sites on the polymer chains which then couple to generate crosslinks. The electron beams are expensive and penetration of the beam once again limits the thickness and shape of end use article.

A third method involves generation of crosslinks using free radicals produced by dissociation of organic molecules such as peroxides. These organic molecules are added to the high molecular weight polymer during extrusion and the end use article is formed. Subsequent heating of the article helps dissociation of the small organic molecule into free radicals which then generate active sites on the polymer capable of coupling to form crosslinks. However, it is not always easy to delay the dissociation of peroxides until the shape of the article is given. Premature decomposition and subsequent prolonged attempts at thermally shaping the polymer can result in a phenomenon called "scorching".

In all three processes, a common factor is the extrusion of high molecular weight polymer which is an energy intensive operation. The present invention is related to the synthesis of high molecular thermoset polyolefin from low molecular weight waxes with very low viscosities. The low viscosity implies relatively large size articles and intricate designs could be produced with less energy. Fast reaction rates of anhydride and amines would result in fast curing of the product. Finally, the presence of functional groups on the polyolefin wax and diamines would facilitate the insertion of any inorganic reinforcements into such thermosets.

Therefore, it would be very advantageous to produce polyolefin (polyethylene, polypropylene and their copolymers) crosslinked thermosets using maleic anhydride functionalized polyolefin waxes, obtained by using metallocene or Ziegler Natta catalysts, with alkyl and alkyl ether diamines.

SUMMARY OF THE INVENTION

Polyolefin (polyethylene, polypropylene and their copolymers) thermosets have been created using the reaction of novel maleic anhydride functionalized waxes [1] obtained by using metallocene or Zeigler Natta catalysts with alkyl and alkyl ether diamines. These materials have a very fast reaction rate. The unreacted metallocene waxes possess low melting temperatures (80° C.-165° C.) and very low viscosities in the melt state allowing them to be processed using equipment commonly used for reaction injection molding of polyurethane materials. Two component systems can be mixed just prior to application (molding, adhesives, coatings, etc.) and cured in place. This eliminates the need to process these materials using conventional thermoplastic processing equipment such as extruders and injection molders. The thermoset materials created will maintain their mechanical integrity at temperatures above the melting point of the starting materials depending on the extent of reaction.

These materials and the associated processes can be used to produce molded articles, novel adhesives, coatings, sealants, etc. The elimination of the need to use conventional thermoplastic processing equipment is expected to lead to the creation of new applications and markets for these types of materials.

Thus the present invention provides cross linked polyolefin thermoset synthesized by a method comprising reaction of a maleic anhydride functionalized reactive polyolefin wax with a polyamine.

Thus, an embodiment of the present invention provides a cross linked polyolefin thermoset material, comprising maleic anhydride functionalized reactive polyolefin wax cross linked with a polyamine.

The polyolefin in the polyolefin wax may be any one of polyethylene, polypropylene and their copolymers, to mention a few non-limiting examples. The polyamine may be any one of primary or secondary alkyl polyamines, alkyl ether polyamines and aryl polyamines to mention a few non-limiting examples.

The cross linked polyolefin thermoset material may be used to produce any one of molded articles, adhesives, coatings, and sealants to mention a few non-limiting examples.

An embodiment of the present invention provides a cross linked polyolefin thermoset material, comprising maleic anhydride functionalized reactive polyolefin wax cross linked with a polyol. The polyol may be any one of alkyl polyols, alkyl ether polyols and aryl polyols to mention some non-limiting examples.

An embodiment of the present invention provides a cross linked polyolefin thermoset synthesized by a method comprising reaction of a maleic anhydride functionalized reactive polyolefin wax with one of a polyamine and a polyol at a temperature sufficient to cross link the maleic anhydride functionalized reactive polyolefin wax with said one of the polyamine and the polyol.

The present invention also provides a method of synthesizing a cross linked polyolefin thermoset product, comprising:

a) simultaneously pumping at an elevated temperature a melt stream of maleic anhydride functionalized reactive polyolefin wax and a melt stream of polyamine through a static mixer, also maintained at an elevated temperature, to form a mixture; and b) dispensing the mixture from the static mixer and heating the mixture at a second temperature for a suitable period of time to induce a desired amount of crosslinking between the maleic anhydride functionalized reactive polyolefin wax and the polyamine to produce a crosslinked polyolefin thermoset product.

In this aspect step b) may include dispensing the mixture into a product mold heated to said second temperature for said suitable period of time to produce the crosslinked polyolefin thermoset product. Alternatively, step b) may include dispensing the mixture as a coating onto a surface and heating the coating to said second temperature for said suitable period of time to produce a layer of the cross linked polyolefin thermoset product on the surface.

The first temperature may be from about 140° C. to about 250° C., and the second temperature may be from about 140° C. to about 250° C.

The present invention also provides a method of synthesizing a cross linkable polyolefin thermoset mixture, comprising:

a) mixing a maleic anhydride functionalized reactive polyolefin wax and a polyamine at a first temperature at which both the anhydride functionalized reactive polyolefin wax and the polyamine are in a solvent free melt state to form a cross linkable polyolefin thermoset mixture; and b) packaging the mixture in a package for distribution.

The first temperature may be in a range from about 140° C. to about 250° C., and depending on the materials used the package may need to package the mixture in an air tight package.

The cross linkable polyolefin thermoset mixture may then be dispensed from the package onto an object and heating said mixture to a second temperature to cross link the maleic anhydride functionalized reactive polyolefin wax and polyamine to form a cross linked thermoset. The second temperature may be in a range from about 140° C. to about 250° C.

Alternatively, the cross linkable polyolefin thermoset mixture may be dispensed from the package into a product mold and heating the mixture to a second temperature to cross link the maleic anhydride functionalized reactive polyolefin wax and polyamine to form a cross linked thermoset product. The second temperature may be in a range from about 140° C. to about 250° C.

A further understanding of the functional and advantageous aspects of the invention can be realized by reference to the following detailed description and accompanying drawings.

BRIEF DESCRIPTION OF THE DRAWINGS

The invention will be more fully understood from the following detailed description thereof taken in connection with the accompanying drawings, which form part of this application, and in which.

DETAILED DESCRIPTION OF THE INVENTION

Figure 1A:
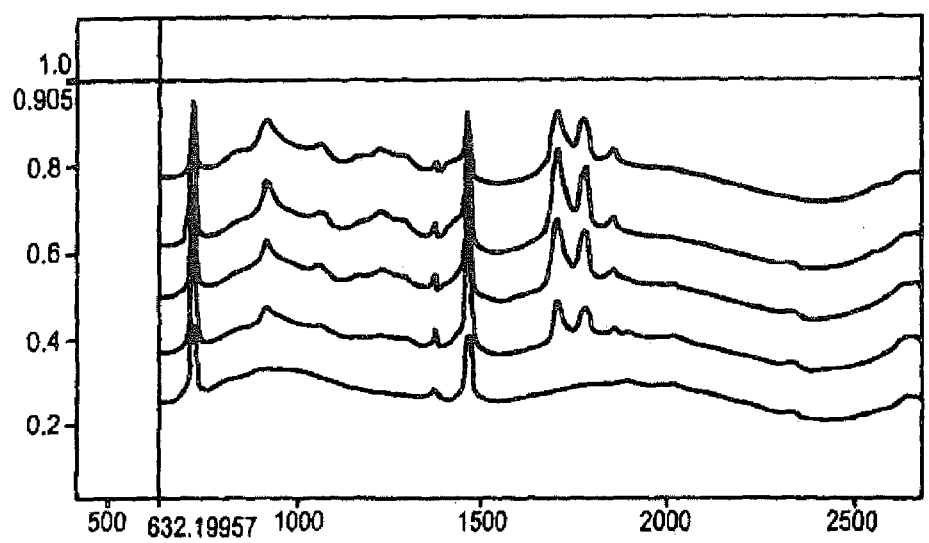
FIG. 1a shows the spectra of blends of PEMA4351 and PE4201.

Generally speaking, the systems described herein are directed to the synthesis of polyolefin thermosets using the reaction of novel maleic anhydride functionalized polyolefin waxes [reference 1 for example]. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to synthesis of polyolefin thermosets using the reaction of novel maleic anhydride functionalized metallocene waxes with a polyamine.

As used herein, the term "about", when used in conjunction with ranges of concentrations or other physical properties, temperatures or other chemical characteristics, is meant to cover slight variations that may exist in the upper and lower limits of the ranges of dimensions of particles so as to not exclude embodiments where on average most of the dimensions are satisfied but where statistically dimensions may exist outside this region. It is not the intention to exclude embodiments such as these from the present invention.

The present invention will now be illustrated using the following non-limiting examples, which are for purposes of illustrating the invention and is not meant to limit the invention to these particular examples.

EXAMPLE 1

This above example illustrate that it is possible to produce thermosets of polyolefins by carrying out reactions between maleic anhydride functionalized olefin with polyetherdiamines in solution.

Experimental

Materials

The maleic anhydride functionalized polyolefin (PEMA4351) and ungrafted polyethylene wax (PE4201) were commercial grades Licocene PEMA 4351 and PE 4201 provided by Clariant GmBH, Germany. Properties of these materials are provided in Table 1. The molecular weights data (Mw, Mn, MWD) was obtained by high temperature GPC at 135 C and was kindly provided by the manufacturer. Polyethylene standards were used for GPC calibration. The maleic anhydride (MA) content was measured by colorimetric titration. Diamine, EDR-176 was a commercial polyetherdiamine supplied by Huntsman Chemicals, USA. The diamine had a Mw of 176 g/mol, was supplied as a liquid and used as received. Antioxidant stabilizers Irgafos 168 and Irganox 1010 used were obtained from Ciba Specialty Chemicals, Basel, Switzerland. Solvents xylene and methanol were reagent grade and used as received.

TABLE 1

Characterization of polyethylene waxes

| | $M_w$ | $M_n$ | $M_w/M_n$ | MAH content[2] |
|---|---|---|---|---|
| PE4201 | — | — | — | 0.0 |
| PEMA4351 | 3000 | 1200 | 2.5 | 7.08 |

[1]Measured by high temperature GPC at 135° C.
[2]Measured by titrations

Reactions

All reactions were carried out in a 500 ml glass resin kettle equipped with a thermometer, drop bottle, condenser and an overhead stirrer. The impeller was a high-speed dispersion blade made of stainless steel. A stirrer bearing was used to ensure no solvent escapes the system. Controlled amounts of PEMA4351, vacuum dried overnight at 110° C., and xylene was added to the clean and dried resin kettle. Approx. 0.01% of antioxidant (AO) a 50/50 mixture of Igafos 168 and Irganox 1010 antioxidants was also added to protect the polymers against possible degradation at high temperatures. The condenser, thermometer, stirrer bearing and stirrer were then placed and the whole assembly was lowered in an oil bath maintained at 200° C. with a feedback controller. Stirring was maintained at 500 rpm for 10 min to ensure complete dissolution of polymer.

Controlled amounts of EDR-176 diamine were then added as a 40% v/v solution using the drop bottle in one shot. The stirrer speed was maintained above 400 rpm as circumstances permitted on addition of amine because of gelation of reaction mixture. The reaction time was 15 minutes unless the material gelled, in which case the reaction had to be terminated earlier. At the end of each reaction, the reaction contents were dropped in methanol to precipitate the polymeric products. The filtered products were dried overnight in fume hood, crushed in a blender with 0.01% of AO and then vacuum dried overnight at 110° C. to remove any trace amounts of solvent left over.

Titrations

The MA content of the PEMA4351 was determined by colorimetric titrations. 0.2 g of the sample was dissolved in 60 ml of Xylene under reflux. The hot solution was then titrated against a standard ~0.01 KOH in methanol. The KOH solution was standardized against a standard HCl (0.01 N) solution. Thymol blue indicator in methanol was used to detect the end point. When the blue coloration did not change for a minute titration was stopped.

FTIR

Thin films of neat PEMA4351 and reaction products were obtained by compression molding at elevated temperatures in a mechanical press. FTIR spectra were collected using a BioRad© FTS 40 FTIR equipped with Win IR software for data collection and analysis. At least 16 scans were applied and data between 400 and 4000 $cm^{-1}$ were recorded. The carbonyl absorption bands around 1792 and 1860 $cm^{-1}$ were monitored to follow the extent of reaction. To account for the variation in thickness of the films, the peak at 720 $cm^{-1}$ representing the methylene groups in the polymer backbone was used as the reference peak.

Rheological Measurements

Dynamic viscoelastic measurements were performed in Advanced Rheometrics Expansion System (ARES), a constant strain rheometer equipped with a transducer capable of measuring torque values ranging from 0.2-200 g-cm. In all measurements parallel plate geometry with 25 mm platens was used. Sample discs of 1.5 mm thickness were prepared by compression molding in a mechanical press to conduct rheological measurements. All measurements were carried out within the linear viscoelastic region established by a strain sweep. Dynamic time and frequency sweeps were performed at different temperatures using a hot air convection oven. Stress relaxation measurements were also performed to assess inhibition of material flow as a consequence of crosslinking of the reaction products.

Results and Discussion

Reactions

Evidence of the reaction between the maleic anhydride grafted PEMA4351 and diamine were evident as soon the amine was dropped in the solution containing grafted polymer. Frothing in the reaction mixture, and a decrease in the RPM of stirrer were observed. Table 2 summarizes the gelation observations during the reaction. Gel formation was observed to be a function of both reaction mixture concentration and $NH_2/MA$ molar ratio. No gelation was observed during the reaction time (15 min) in dilute (40 g/160 ml) systems irrespective of $NH_2/MA$ molar ratio used. In the concentrated system (60 g/120 ml) gelation occurred only when $NH_2/MA=1.0$. For the very concentrated (60 g/60 ml) system gelation was observed at all $NH_2/MA$ values.

TABLE 2

Summary of observations during the reactions and sample preparation for characterization

| Reaction System | | Observation during reaction | FTIR film formation | Disc formation |
|---|---|---|---|---|
| Dilute (40 g + 160 ml) | 0.5 | No gelation | Yes | Yes |
| | 1.0 | No gelation | Yes | No |
| | 1.5 | No gelation | Yes | Yes |
| | 2.0 | No gelation | Yes | Yes |
| Concentrated (60 g + 120 ml) | 0.5 | No gelation | Yes | Yes |
| | 1.0 | Gelled instantaneously | No | No |
| | 1.5 | No gelation | Yes | Yes |
| | 2.0 | No gelation | Yes | Yes |
| Highly concentrated (60 g + 60 ml) | 0.5 | Gelled instantaneously | No | No |
| | 1.0 | Gelled instantaneously | No | No |
| | 1.5 | Gelled instantaneously | No | No |
| | 2.0 | Gelled instantaneously | No | No |

In order to analyze the extent of reaction achieved and property change in the reaction products by FTIR and rheological measurements, thin films and circular discs of the reaction products had to be prepared by compression molding at elevated temperatures. However, not all reaction products could be successfully made into thin films and discs. Once again Table 2 summarizes the results. With the exception of dilute system $NH_2/MA=1.0$ where a film was achieved but no disc could be formed, agreement exists between the gel formation during the reaction and the unsuitability of the material to form disc. A closer look at these discs and films suggested inability of the grain/particles to fuse together (sinter) to form disc or film. This indicates that the material is crosslinked to a high degree and therefore does not sinter easily.

FTIR

Figure 1B:
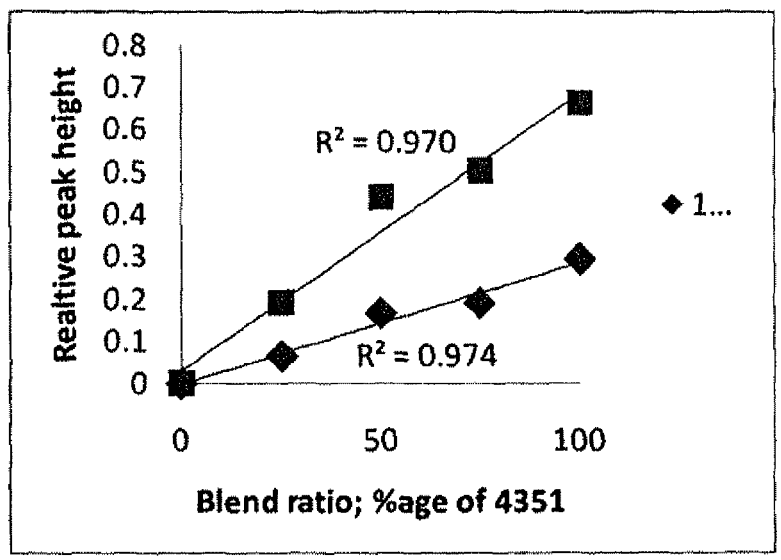
FIG. 1b is a plot of relative peak heights vs. blend composition.

FTIR was used to assess the extent of reaction. In order to use the FTIR results quantitatively, a calibration plot was generated. In the absence of calibration standards blends of maleic anhydride grafted PEMA4351 and ungrafted PE4201 were prepared in different compositions. The absorbance at 1860 and 1792 cm$^{-1}$ associated with the carbonyl of maleic anhydride were recorded. The peak at 720 cm$^{-1}$ assigned to the $CH_2$ groups in the PE backbone was taken as the reference peak. FIG. 1a shows the FTIR spectra for the blends and pure PEMA4351 and PE4201. An increase in the absorbance at 1860 cm$^{-1}$ and 1792 cm$^{-1}$ is observed with the increase of maleic anhydride grafted material in the blend. The relative peak height (target peak/reference peak) at 1860 and 1792 cm$^{-1}$ are plotted against blend composition in FIG. 1b. A linear trend is observed between the relative peak heights and maleic anhydride concentration in the blend.

Figure 2A:
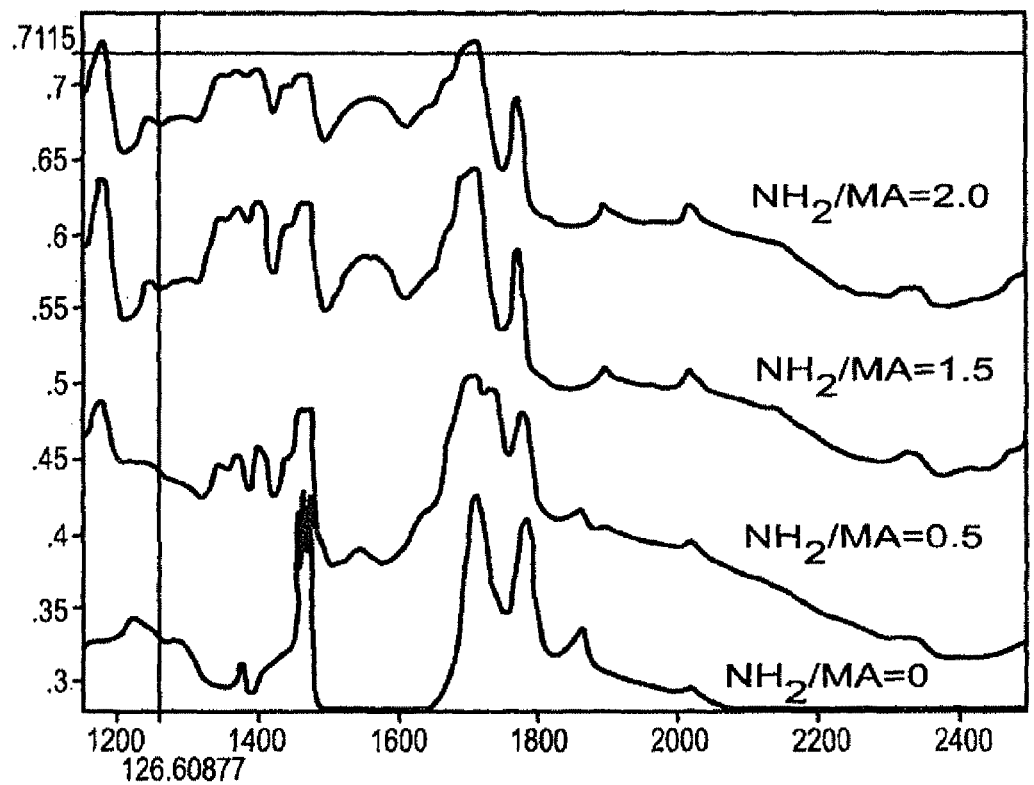
FIG. 2a shows the Fourier Transform Infrared (FTIR) spectra for PEMA4351 reacted with EDR176 diamine.
Figure 2B:
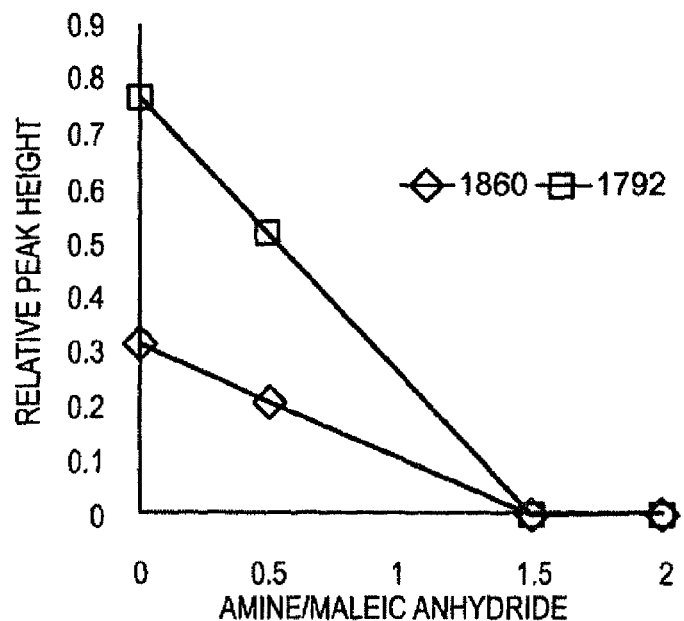
FIG. 2b shows a plot of relative peak height of 1860 and 1792 peaks against $NH_2/MA$.

FIGS. 2a and 2b shows the FTIR spectra and relative peak height at 1860 and 1792 cm$^{-1}$ plotted against the $NH_2$/MA content in the reaction mixture for the concentrated (60 g/120 ml) system. The maleic anhydride peak gradually disappears with increasing $NH_2$/MA ratio. At $NH_2$/MA ratio of 1.5 and 2.0 no peak is observed suggesting complete reaction. The missing data at $NH_2$/MA=1.0 is due to the fact that we were unable to form a film for FTIR analysis for this sample.

Rheological Measurements

Figure 3A:
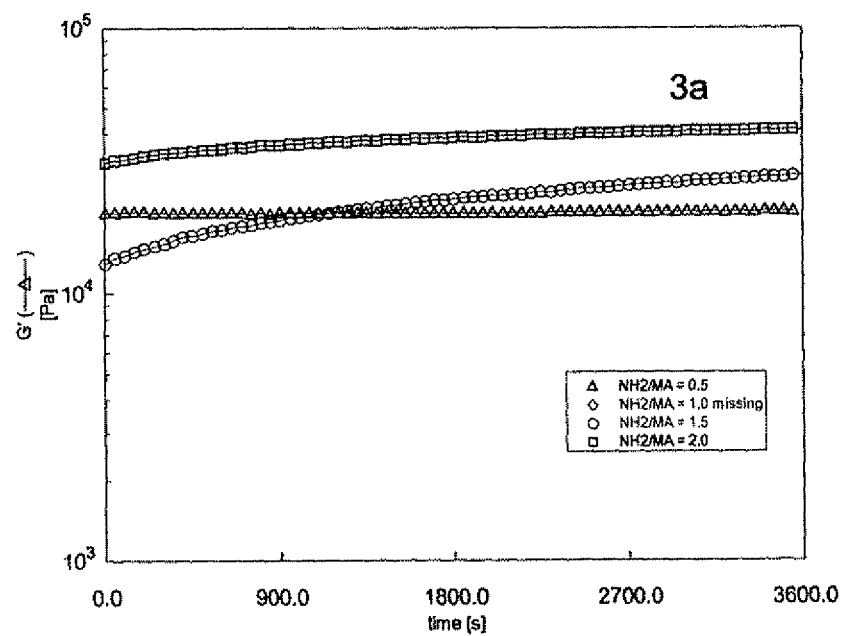
FIG. 3 shows time sweeps for (a) dilute (40 g/160 ml) and (b) concentrated (60 g/120 ml) systems; 140 C; $\gamma°=5\%$; $\omega=1$ rad/s.
Figure 3B:
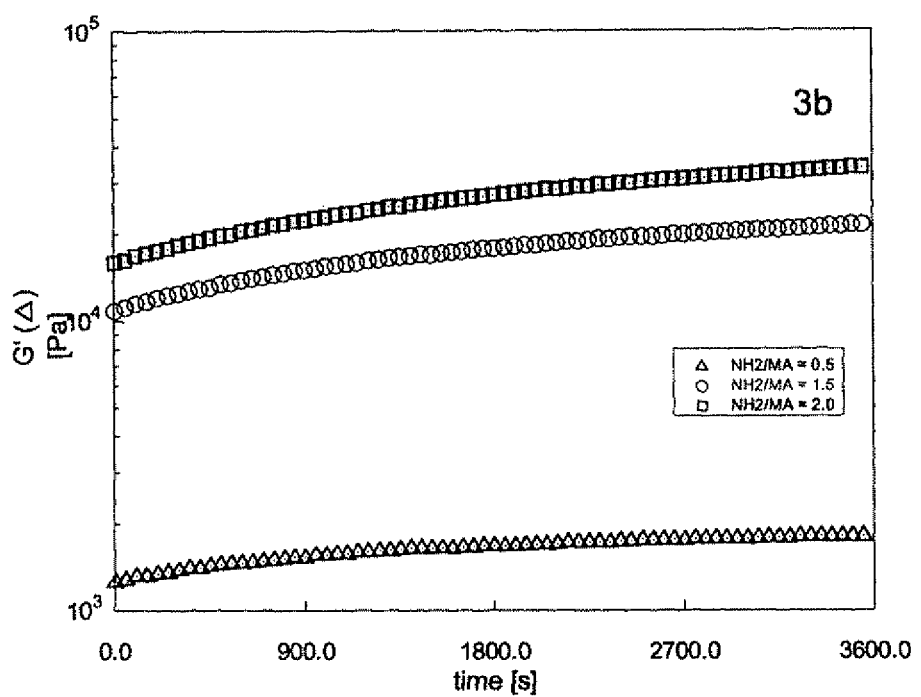

Rheological measurements in the linear viscoelastic region were performed to assess the residual reactive species/degradation and changes in structure of the reactive polyolefin prepolymers (crosslinking). FIG. 3a shows the time sweeps for materials recovered from the dilute solution experiments. Whereas, the reaction products at molar ratio $NH_2$/MA=0.5 do not show any change in storage modulus (G') over one hour at 140 C, a slight increase in G' is observed for products when the molar ratio $NH_2$/MA=1.5 and 2. This increase is more pronounced for material recovered from experiments in concentrated solution as seen in FIG. 3b. These results suggest that some further reaction is taking place during the rheological measurements.

Figure 4A:
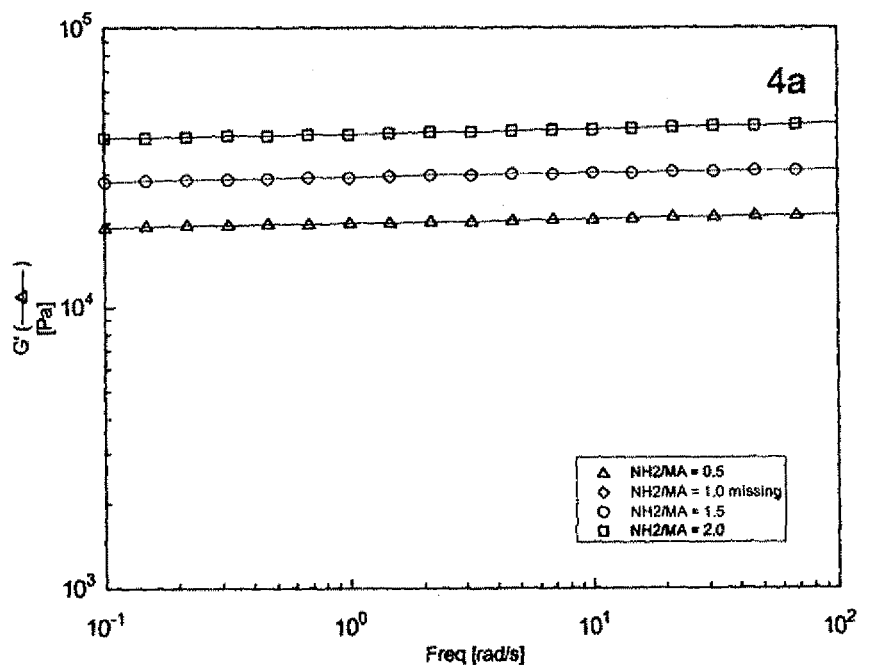
FIG. 4 shows frequency sweeps for (a) dilute (40 g/160 ml) and (b) concentrated (60 g/120 ml) systems; 140° C.; $\gamma°=5\%$.

Results for the frequency sweeps at 140 C for the dilute and concentrated system are presented in FIGS. 4a and 4b respectively. No appreciable change in G' was observed over almost three decades of frequency. This is typical behavior of crosslinked materials. The varying G' plateau values of modulus for the systems investigated are likely associated with the varying degree of crosslinking achieved in each system. In materials recovered from both, the dilute and concentrated solution experiments, the maximum G' is observed for $NH_2$/MA=1.5 followed by $NH_2$/MA=2.0 and 0.5 respectively.

Figure 5A:
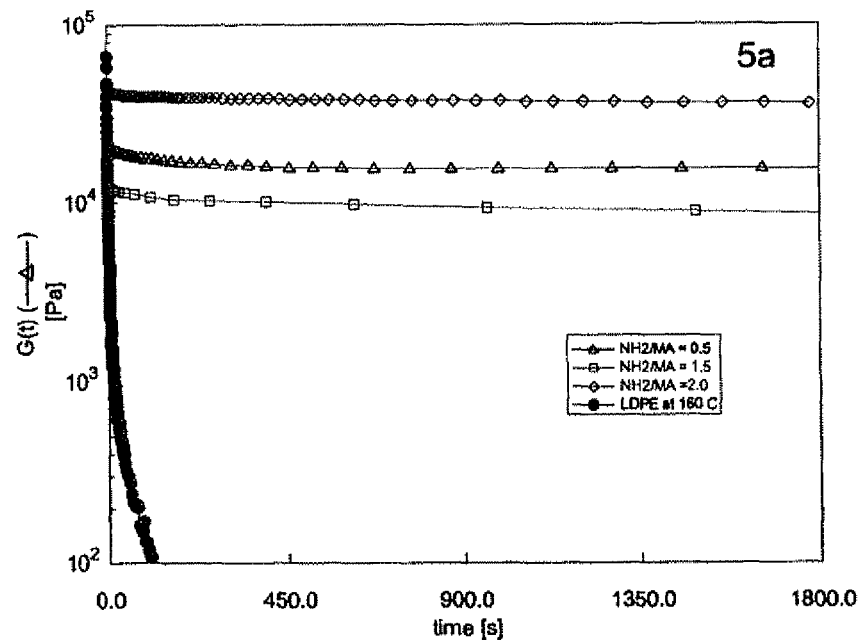
FIG. 5 shows stress relaxation for (a) dilute (40 g/160 ml) and (b) concentrated (60 g/120 ml) systems; 140° C.; $\gamma°=5\%$.
Figure 5A:
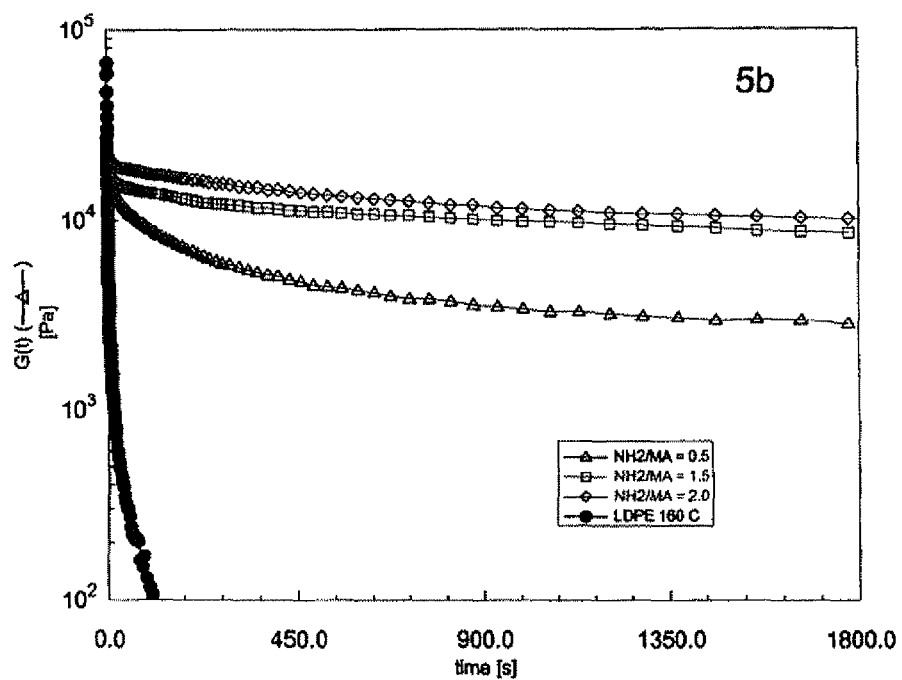

To further assess the presence of crosslinking in the reaction products stress relaxation experiments were performed. In all cases a step strain of 5% which was within the linear viscoelastic range was applied and torque was monitored to know how the material relaxes. A low density polyethylene sample was also tested under similar conditions at 160 C was used as a reference uncrosslinked material. The results are presented in FIGS. 5a and 5b. Whereas, the torque values uncrosslinked LDPE dropped to almost zero within 100 seconds after the application of strain, torque values never approached zero even after half an hour. This is a typical behavior of crosslinked material. For all reaction products the torque leveled off at different values of equilibrium torque ($\tau_e$) depending on the degree and nature of cross linking achieved.

EXAMPLE 2

This above example illustrate that it is possible to produce thermosets of polyolefins by carrying out reactions between maleic anhydride functionalized olefin with polyetherdiamines in the solvent free melt state.

Experimental

Materials

Licocene PEMA4351 (maleic anhydride grafted polyethylene) was supplied by Clariant® Canada, Inc. With these materials maleic anhydride grafting is carried out in a batch process using a free radical mechanism as described in the patent literature [1]. The grafts are believed to be distributed randomly based on the free radical mechanism utilized to achieve them. PEMA4351 received as fine grains was vacuum dried overnight at 100° C. before use. Polyether diamine (ED600) was obtained from Huntsman Chemicals, USA. It is a liquid at room temperature and was used as received.

The polyether backbone constitutes predominantly polyethylene oxide units although some propylene oxide units are also present. The important characteristics of the materials are presented in Table 3. MW, viscosity and density values reported were obtained from the supplier. Titrations were performed in our lab.

TABLE 3

| | | Characteristics of materials | | | | |
|---|---|---|---|---|---|---|
| | | $M_w$ g/mol | $M_n$ | $M_w/M_n$ | Viscosity (mPa·s) | Density (g/cm$^3$) | MAH content[3] (%) |
| PEMA4351 | (structure) | 3000 | 1200 | 2.5 | 300[1] | — | 5.20 (59.4 mg KOH/g) |

TABLE 3-continued

| | | $M_w$ g/mol | $M_n$ | $M_w/M_n$ | Viscosity (mPa·s) | Density (g/cm$^3$) | MAH content[3] (%) |
|---|---|---|---|---|---|---|---|
| ED600 | H$_2$N-[CH(CH$_3$)CH$_2$O]$_x$-[CH$_2$CH(CH$_3$)O]$_y$-[CH$_2$CH(CH$_3$)O]$_z$-NH$_2$; y = 9; x + z = 3.6 | — | 600 | — | 75[2] | 1.035 | — |

[1] measured at 140° C.;
[2] measured at 140° C.
[3] assessed by colorimetric titrations Preparation of Reaction Products Reactions were carried out in the melt at different NH$_2$/MA molar ratios using either a melt blender or a resin kettle as described in Table 4. The melt blender used was a Haake PolyLab system. PEMA4351 was first added to a preheated mixing chamber (150° C.) and allowed to melt. Diamine was then added and mixing continued for 20 minutes at 150° C.

For reactions carried out in a resin kettle, controlled amounts of PEMA4351 and ED600 diamine were added to the clean, dried glass kettle at room temperature. The kettle was then placed in a heating mantle and the temperature was increased approximately linearly with time to about 150° C. with continuous stirring (1000 rpm) using an overhead stirrer while monitoring the temperature and rotational speed of the agitator. The reaction was continued until the reaction mixture exhibited the Weissenberg effect at which point the reaction mixture was removed from the resin kettle.

Samples recovered from the resin kettle or melt blender were further processed by compression molding the material using a hydraulic press and aluminum molds at different temperatures and length of time.

TABLE 4

Reaction products preparation method

| Products Licocene-diamine | NH$_2$/MA | Method of preparation |
|---|---|---|
| PEMA4351 ED600 | 0.66 | Melt blender |
| | 1.0 | Melt blender |
| | 1.5 | Resin kettle |
| | 2.0 | Resin kettle |
| | 3.0 | Resin kettle |

Titrations

Approximately 0.2 g of the sample was dissolved in 60 ml of xylene under reflux in a 500 ml round bottom flask. Once the polymer was dissolved, the hot solution was titrated against standard KOH solution (~0.02 M) prepared in methanol. Thymol blue dissolved in methanol was used as indicator. When the blue color persisted for one minute the titration was stopped and degree of grafting assessed as mg KOH/g of polymer. These values can be used to calculate the degree of maleic anhydride grafted using simple stoichiometric calculations provided elsewhere [5].

Gel Content

Measured amounts (approximately 0.2-0.3 g) of polymeric sample were cut into small pieces and enclosed in small pouches made of 120×120 mesh Type 304 stainless steel wire cloth. These pouches were then suspended in refluxing xylene for more than 12 hours according to ASTM D2765. Samples were removed from the solvent, washed with acetone and allowed to dry. The loss in weight was used to calculate the degree of gel content.

FTIR

FTIR spectra were generated using a Nicolet® 510 FTIR instrument. Thin films of the samples were prepared by compression molding in a mechanical or hydraulic press at elevated temperatures. Spectra were recorded between 400-4000 cm$^{-1}$. At least 32 scans were performed to generate a spectrum.

Results and Discussion

The materials recovered from reactive processing in the melt blender or the resin kettle exhibited physical manifestations that would indicate that some reaction had occurred. For example, a visual increase in viscosity and elasticity at the temperature of processing was evident.

Unexpectedly, measurement of the residual acid content by colorimetric titration shows that complete consumption of anhydride groups did not occur in the reaction product as reported by earlier studies [2-4]. These measurements are only representative of a portion of the reaction product for some of the samples because of incomplete dissolution of the reaction product. As shown in the Table 5 the residual maleic anhydride content in the reaction products from the melt blender are 1.89-2.16% (21-25 mg KOH/g) and are a bit higher in the products that were reaction processed in the resin kettle (~2.7% (~30 mg KOH/g)). Almost 50% of the initial maleic anhydride content 5.2% (60 mg KOH/g) is still unreacted.

TABLE 5

Residual maleic anhydride in the reaction products

| NH2/MA molar ratio | Residual acid content (mg KOH/g) | Dissolution observation |
|---|---|---|
| 0.66 | 21.6 ± 1.9 | Did not dissolve fully prior to titration |
| 1.0 | 24.7 ± 1.4 | Did not dissolve fully prior to titration |
| 1.5 | 31.1 ± 0.5 | Dissolved but precipitate out on titration with methanolic KOH |
| 2.0 | 30.6 ± 0.8 | Dissolved but precipitate out on titration with methanolic KOH |
| 3.0 | 30.3 ± 1.0 | Completely dissolved and no precipitation on addition of methanolic KOH |

The titration data indicate that complete reaction has not occurred with the materials obtained from mixing in the melt blender and the resin kettle. These materials were further processed by compression molding the materials in aluminum molds at elevated temperatures of 160° C., 180° C. and 200° C.

The reaction products exhibited flow and completely filled the molds on application of pressure at elevated temperatures. This indicates that the reaction products are still thermoplastic and can be shaped by injection or compression molding. This is tremendously encouraging from the commercial application point of view.

Figure 6:
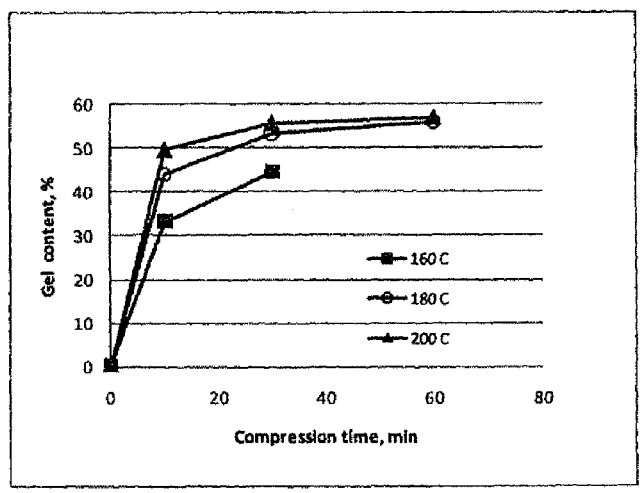
FIG. 6 shows gel contents for reaction product $NH_2/MA$ 1.5 vs. the cure time at different temperatures.
Figure 7:
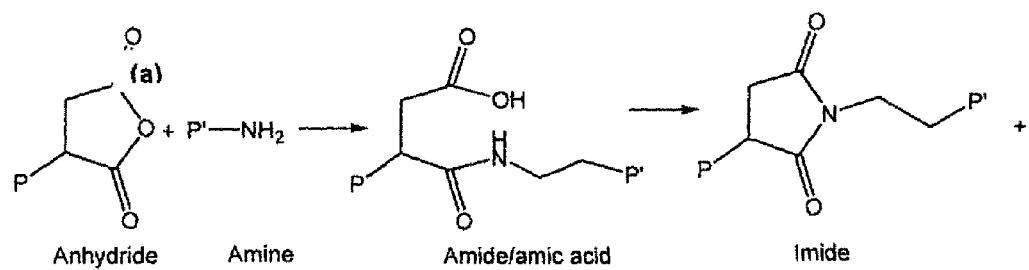
FIG. 7 shows the reaction products for (a) maleic anhydride and amine.

Measurements of the gel content of samples that were processed at the different temperatures for different periods of time are presented in FIG. 6. The data at zero minutes is the measured gel content for the materials recovered from the reactor. A value less than 1% indicates that little or no crosslinking is present in this material. The gel content in processed materials was observed to be quite different. Within 10 minutes of molding at 160° C. more than 30% of the material converted to insoluble gel. The degree of gelation was even higher at higher temperatures. The gel content of the processed materials was observed to be a function of both time and temperature. At all temperatures investigated more crosslinking was observed at longer processing times.

The increase in gel content as a result of high temperature processing confirms that coupling reactions continued during subsequent processing which results in more crosslinks and hence increased insoluble "gel" material. This phenomenon has not been previously reported for these types of systems.

Figure 4A:
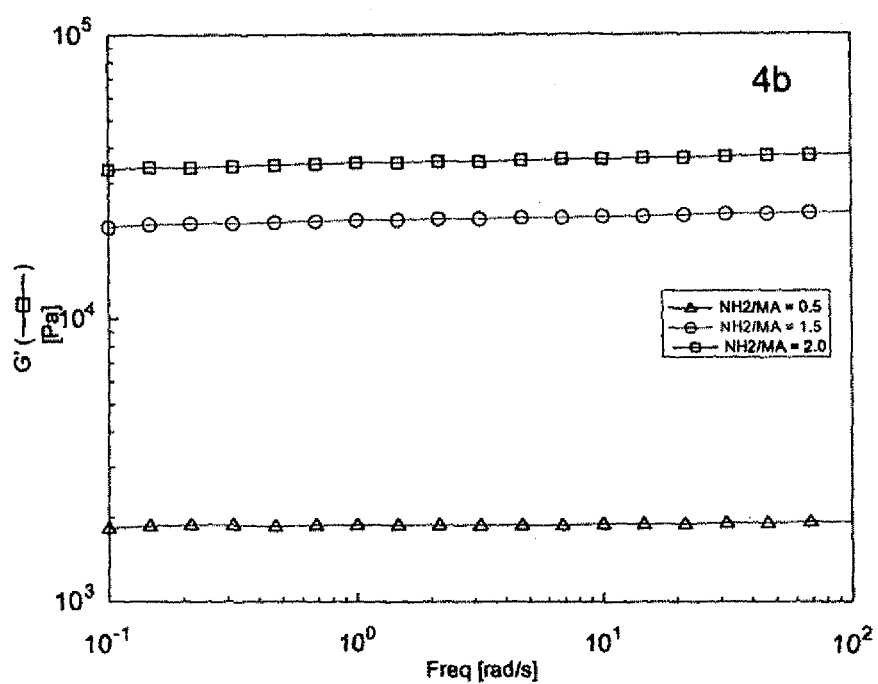
Figure 8:
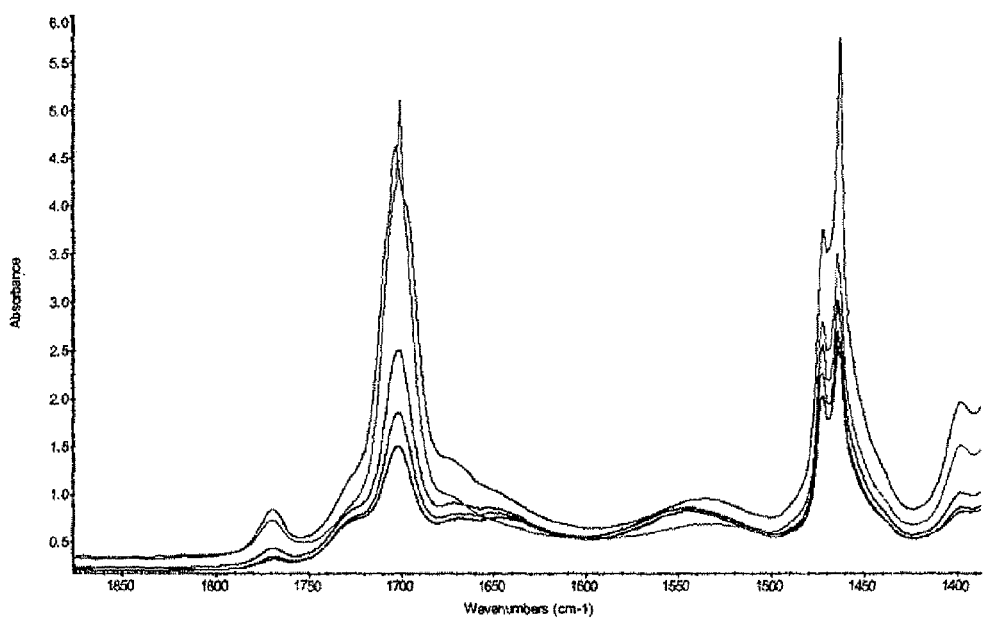
FIG. 8 shows the FTIR spectra for reaction products $NH_2/MA$ 1.5 compression molded for varying time at 160° C.

FIG. 4 shows the anticipated crosslinking reactions in these type of systems [3, 4]. Spectroscopic measurements were used to follow the reaction chemistry in the compression molded samples as a function of processing history. Specifically, the emergence of the imide absorptions in the FTIR spectra at wavenumbers 1700 and 1770 cm-1 as well as amide responses at 1640 and 1550 $cm^{-1}$ are evident in the FTIR spectra of which FIG. 8 is an example. It can clearly be seen that the relative imide absorptions are increasing with compression molding time.

Figure 9:
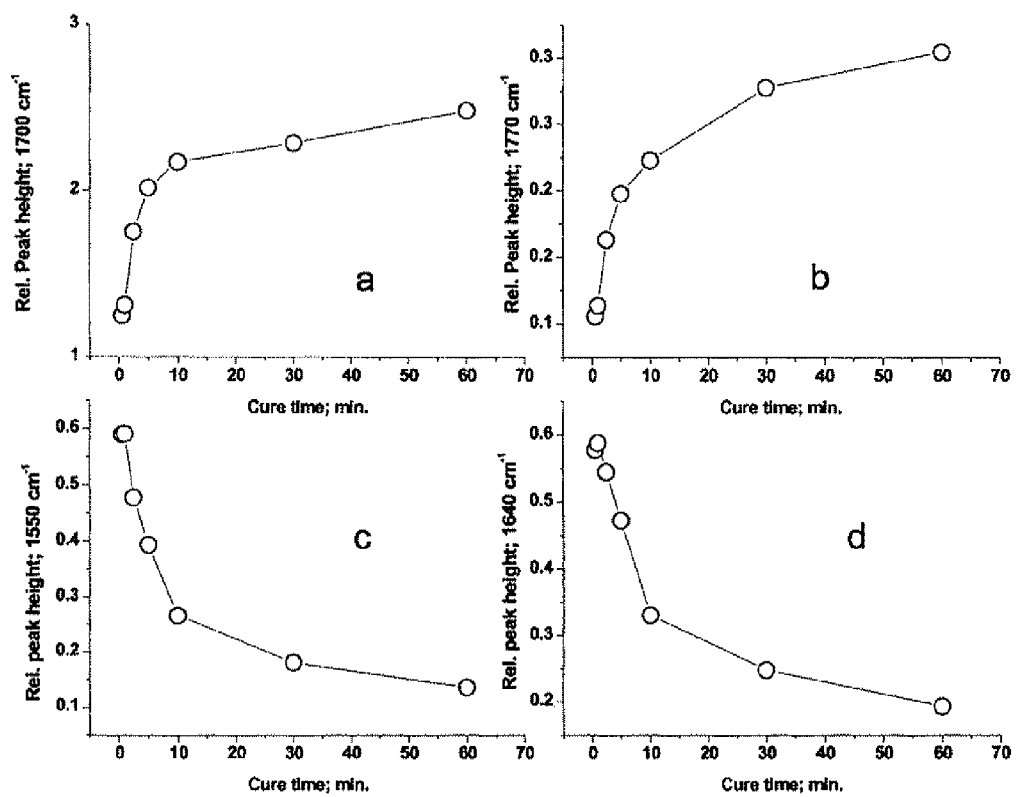
FIG. 9 shows the change in FTIR relative peak heights for imide and amide functionalities as a consequence of processing time at 160° C.

Ratios of these imide and amide absorptions with a reference peak (methylene absorption at 720 cm-1) are plotted in FIG. 9 as a function of compression molding time at 180° C., for the reaction product produced using an $NH_2$/MA mole ratio of 1.5. This data shows that the concentration of imide groups in increasing in the compression molded product as the material is processed for longer times. A decrease in the concentration of amide groups is also observed. This data is consistent with the change in gel content reported in FIG. 6.

These examples demonstrate that the reaction products of maleated reactive olefin prepolymers with polyether diamines can be subsequently processed as one component thermosetting materials. This has not been previously reported for materials of this type. These reaction products have significant utility as molding compounds, coatings, adhesives and sealants, for example.

The ranges of polyamine in the cross linked thermoset product may be quite broad because it depends on polyamine molecular weight. At a given mole ratio of amine to anhydride, the weight fraction of low molecular weight polyamine will be significantly less than the corresponding weight fraction of polyamine needed when a higher molecular weight polyamine is used. The polyamine may be present in the thermoset material in a range from about 1% by wt to about 90% by wt depending on a molecular weight of the amine used and the amount of reactive functionality per weight of the polyolefin wax. In preferred thermoset materials the polyamine is present in the material in a range from about 25% by wt to about 75% by weight.

The present thermoset materials disclosed herein may include a mixture of more than one maleic anhydride functionalized reactive polyolefin wax and/or more than one type of polyamine. For example, in some applications it may be advantageous to use more than one type of polyamine, for example one may use a mixture of polyamines that includes difunctional and trifunctional materials in order to alter the properties of the thermoset. The use of combinations of multifunctional coreactants to achieve network polymers having a different degree and architecture of crosslinking is used in other thermosetting systems such as epoxies and urethanes and will be known to those skilled in the art.

Likewise, it can also be advantageous to use blends of functionalized polyolefin wax as a coreactant in order to alter or achieve different properties in the thermoset produced. For example, it might be advantages to blend functionalized polypropylene based waxes with functionalized polyethylene based waxes in order to alter the balance of properties of the thermoset produced. Advantage can also be had by blending waxes having different levels of concentration of functional groups, but homologous in olefin type to produce multiphase morphologies in the resulting thermoset.

While the current examples illustrate the production of polyolefin thermosets using maleic anhydride functionalized polyolefin wax as a starting material, it will be appreciated by those skilled in the art that low molecular weight polyolefin polymers that have been functionalized with carboxylic acid functionality can also be used to generate thermosetting materials in reactions with polyamines. In fact, hydrolysis of the maleic anhydride in maleic anhydride functionalized polyolefin wax yields carboxylic acid functionality which can also participate in reaction with amines. This hydrolysis is known to occur when maleic anhydride functionalized waxes are exposed to atmospheric moisture for extended periods of time, for example. It is common practice in commercial applications that use maleic anhydride functionalized polyolefin polymer to "dry" the polymer at elevated temperatures for some time in order to reverse this hydrolysis and regenerate the maleic anhydride. It is not surprising then that, melt reactions between acrylic acid functionalized polyolefin wax and polyamines will also yield thermosetting materials given conditions sufficient to drive the reaction. Thus, as used herein, the phrase "maleic anhydride functionalized reactive polyolefin wax" is meant to cover acrylic acid functionalized polyolefin waxes as well as the circumstance in which a polyolefin wax has been modified to functionalize the polyolefin with carboxylic acid groups or their salts.

The above examples illustrate that it is possible to produce thermosets of polyolefins by carrying out reactions between maleic anhydride functionalized olefin with polyetherdiamines in solution or in the solvent free melt state. An added benefit of carry out the reaction process in the melt state is that there is no need to recover the thermoset created from a solvent. The coreactants may be processed using techniques such as those employed for reaction injection molding (RIM) of polyurethane coreactants to produce molded articles without the need to use extrusion or extrusion based injection molding equipment.

Those skilled in the art will be aware that typical processing of polyurethane coreactants in a RIM process involves the use of pumps and mixing devices such as static mixers to stoichiometrically mix coreactants as they enter a mold to cure to produce articles of commerce. Two component reactive systems are used commercially for the production of molded articles, adhesives, sealants, coatings and other materials of commerce.

An additional advantage observed in the work here with these polyolefin prepolymer materials is that it is possible to combine coreactants in the melt without having a complete reaction ensue. This allows the combined materials to be processed as a one component reactive thermoplastic liquid that can be caused to convert to a thermosetting material be heating to elevated temperatures. One component heat-activated curable thermoplastics that convert to thermosetting materials upon heating can be used commercially to make one component molding compounds, adhesives, sealants, coatings and other materials of commerce.

While, in the above examples no attempt was made to influence the rate of production of thermoset material, those skilled in the art will recognize that the rate of thermoset production can be influenced by variation of the stoichiometry and/or additives. In these examples, it was observed that stoichiometries involving equimolar amine and carboxylic acid content achieved the gel point much more quickly than some other stoichiometries. It may also be possible to use additives (such as p-toluenesulfonic acid) that are known to acid catalyze the formation of amide or imide to influence the rate of reaction.

Conclusions

Reactions between maleic anhydride grafted reactive polyolefin waxes and polyamines were successfully carried out to generate crosslinked thermoset products. The observed reaction in terms of frothing, viscosity build up and gel formation seems to be fast. Gel (swelling of reaction mixture) was observed to be a function of reaction mixture concentration as well as the $NH_2$/MA molar ratio. FTIR analysis was successfully carried out to assess the extent of reaction. Rheological measurements in the linear viscoelastic region (strain, time sweeps, dynamic frequency sweeps and stress relaxation) experiments suggest good conversion and presence of crosslink in the reaction product.

As used herein, the terms "comprises", "comprising", "including" and "includes" are to be construed as being inclusive and open-ended. Specifically, when used in this document, the terms "comprises", "comprising", "including", "includes" and variations thereof, mean the specified features, steps or components are included in the described invention. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

References

1. Hohner G. U.S. Pat. No. 5,998,547 and Hohner G.; Bayer M. U.S. Pat. No. 7,005,224.
2. Orr, C. A.; Cernohous, J. J.; Guegan, P.; Hirao, A.; Jeon, H. K.; Macosko, C. W. *Polymer* 2001, 42, 8171-8178.
3. Lu, Q.-.; Macosko, C. W.; Horrion, J. *J. Polym. Sci. Part A* 2005, 43, 4217-4232.
4. Song, Z.; Baker, W. E. *J. Polym. Sci. Part A* 1992, 30, 1589-1600.
5. Gaylord, N. G.; Mehta, R.; Mohan, D. R.; Kumar, V. *J Appl Polym Sci* 1992, 44, 1941-1949.
6. Socrates, G. In *Infrared and Raman characteristic group frequencies: tables and charts*; Wiley: Chichester; New York, 2000;, pp 347.

Therefore what is claimed is:

1. A cross-linked polyolefin thermoset material, comprising:
    maleic anhydride functionalized reactive polyolefin wax cross-linked with a polyamine, wherein said polyamine is present in said thermoset material in a range from about 25% by weight to about 75% by weight.

2. The cross-linked polyolefin thermoset material according to claim 1 wherein the polyolefin in said polyolefin wax is selected from the group consisting of polyethylene, polypropylene and their copolymers.

3. The cross-linked polyolefin thermoset material according to claim 1 wherein said polyamine is selected from the group consisting of primary or secondary alkyl polyamines, alkyl ether polyamines and aryl polyamines.

4. The cross-linked polyolefin thermoset material according to claim 1 formed as any one of molded articles, adhesives, coatings, and sealants.

5. The cross-linked polyolefin thermoset material according to claim 1 synthesized by a method comprising reaction of maleic anhydride functionalized reactive polyolefin wax with polyamine at a temperature sufficient to cross-link the maleic anhydride functionalized reactive polyolefin wax with said polyamine.

6. The cross-linked polyolefin thermoset material according to claim 5 wherein said reaction of maleic anhydride grafted reactive polyolefin prepolymer and polyamine includes
    mixing pre-selected amounts of maleic anhydride functionalized polyolefin waxes and xylene in a reaction vessel under stirring conditions,
    heating said reaction vessel to about 200° C. and mixing in a preselected amount of polyetherdiamine and wherein a cross-linking polymerization occurs to produce a cross-linked polyolefin thermoset product and terminating said reaction when either gelation is observed or continuing the reaction up to about 15 minutes,
    transferring the reaction mixture to a suitable solvent to precipitate a cross-linked polyolefin thermoset product; and
    collecting the cross-linked polyolefin thermoset product.

7. The cross-linked polyolefin thermoset material according to claim 6 wherein the maleic anhydride functionalized polyolefin waxes are obtained using metallocene or Ziegler Natta catalysts.

8. The cross-linked polyolefin thermoset material according to claim 6 including adding an polymeric antioxidant agent to the mixture of maleic anhydride functionalized polyolefin wax and xylene.

9. The cross-linked polyolefin thermoset material according to claim 6, wherein said polyamine is added as a 40% v/v solution to said mixture of maleic anhydride functionalized polyolefin wax and xylene.

10. The cross-linked polyolefin thermoset material according to claim 6 wherein said solvent is methanol.

11. The cross-linked polyolefin thermoset material according to claim 6 formed as molded articles, adhesives, coatings, and sealants.

12. A method of synthesizing a cross-linked polyolefin thermoset product, comprising:
    a) simultaneously pumping at an elevated temperature a melt stream of maleic anhydride functionalized reactive polyolefin wax and a melt stream of polyamine through a static mixer, also maintained at an elevated temperature, to form a mixture; and
    b) dispensing the mixture from the static mixer and heating the mixture at a second temperature for a suitable period of time to induce a desired amount of crosslinking between the maleic anhydride functionalized reactive polyolefin wax and the polyamine to produce a crosslinked polyolefin thermoset product.

13. The method according to claim 12 wherein step b) includes dispensing said mixture into a product mold heated to said second temperature for said suitable period of time to produce the crosslinked polyolefin thermoset product.

14. The method according to claim 12 wherein step b) includes dispensing said mixture as a coating onto a surface and heating the coating to said second temperature for said suitable period of time to produce a layer of the cross-linked polyolefin thermoset product on the surface.

15. The method according to claim 12, wherein said first temperature is from about 140° C. to about 250° C.

16. The method according to claim 12, wherein said second temperature is about 140° C. to about 250° C.

17. The method according to claim 12, wherein the polyolefin in said polyolefin wax is selected from the group consisting of polyethylene, polypropylene and their copolymers.

18. The method according to claim 12, wherein said polyamine is selected from the group consisting of primary or secondary alkyl polyamines, alkyl ether polyamines and aryl polyamines.

19. A method of synthesizing a cross-linkable polyolefin thermoset mixture, comprising:
  a) mixing a maleic anhydride functionalized reactive polyolefin wax and a polyamine at a first temperature at which both the anhydride functionalized reactive polyolefin wax and the polyamine are in a solvent free melt state to form a cross-linkable polyolefin thermoset mixture; and
  b) packaging the mixture in a package for distribution.

20. The method according to claim 19 wherein said first temperature is in a range from about 140° C. to about 250° C.

21. The method according to claim 19 wherein said package is air tight.

22. The method according to claim 19, including dispensing said cross-linkable polyolefin thermoset mixture from said package onto an object and heating said mixture to a second temperature to cross-link the maleic anhydride functionalized reactive polyolefin wax and polyamine to form a cross-linked thermoset.

23. The method according to claim 22 wherein said second temperature is in a range from about 140° C. to about 250° C.

24. The method according to claim 19, including dispensing said cross-linkable polyolefin thermoset mixture from said package into a product mold and heating said mixture to a second temperature to cross-link the maleic anhydride functionalized reactive polyolefin wax and polyamine to form a cross-linked thermoset product.

25. The method according to claim 24 wherein said second temperature is in a range from about 140° C. to about 250° C.

26. The method according to claim 19 wherein the polyolefin in said polyolefin wax is selected from the group consisting of polyethylene, polypropylene and their copolymers.

27. The method according to claim 19 wherein said polyamine is selected from the group consisting of primary or secondary alkyl polyamines, alkyl ether polyamines and aryl polyamines.

28. The method according to claim 12 used to produce any one of molded articles, adhesives, coatings, and sealants.

29. The method according to claim 19 used to produce any one of molded articles, adhesives, coatings, and sealants.

30. The cross-linked polyolefin thermoset material according to claim 1 wherein the polyolefin in said polyolefin wax includes two or more polyolefins.

31. The cross-linked polyolefin thermoset material according to claim 1 wherein the polyamine includes two or more different polyamines.

* * * * *